US008421869B2

(12) United States Patent
Silverbrook et al.

(10) Patent No.: US 8,421,869 B2
(45) Date of Patent: *Apr. 16, 2013

(54) CAMERA SYSTEM FOR WITH VELOCITY SENSOR AND DE-BLURRING PROCESSOR

(75) Inventors: Kia Silverbrook, Balmain (AU); Paul Lapstun, Balmain (AU)

(73) Assignee: Google Inc., Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/021,780

(22) Filed: Feb. 6, 2011

(65) Prior Publication Data

US 2011/0122263 A1   May 26, 2011

Related U.S. Application Data

(63) Continuation of application No. 12/642,831, filed on Dec. 20, 2009, now Pat. No. 7,907,178, which is a continuation of application No. 11/499,806, filed on Aug. 7, 2006, now Pat. No. 7,646,403, which is a continuation of application No. 09/113,090, filed on Jul. 10, 1998, now Pat. No. 7,110,024.

(30) Foreign Application Priority Data

Jul. 15, 1997  (AU) .................................. PO7991
Aug. 11, 1997 (AU) .................................. PO8497

(51) Int. Cl.
*H04N 5/228* (2006.01)
(52) U.S. Cl.
USPC ................ 348/208.99; 348/208.2; 348/208.4
(58) Field of Classification Search .................. None
See application file for complete search history.

(56) References Cited

U.S. PATENT DOCUMENTS 3,573,437 A    4/1971  Scuitto et al.
3,663,801 A    5/1972  Wahli et al.
(Continued)

FOREIGN PATENT DOCUMENTS

CA    2079534    4/1993
DE     248983    8/1987
(Continued)

OTHER PUBLICATIONS

Laurent Petit and Jean-Didier Legat, "VLIW Processor Architecture Adapted to FPAs", May 1998, SPIE, vol. 3410, only p. 128 submitted.

(Continued)

*Primary Examiner* — Luong T Nguyen
(74) *Attorney, Agent, or Firm* — McAndrews, Held & Malloy, Ltd.

(57) ABSTRACT

A camera system for outputting deblurred still images includes a portable handheld camera device comprising an image sensor for recording an image; a two-dimensional accelerometer for detecting an angular velocity of the camera system relative to an external environment and to produce an angular velocity output indicative thereof; a linear image sensor for sensing data provided on an encoded card inserted into the camera system, the encoded card containing instructions for the manipulation of the image; and a processor for receiving the image from the image sensor, receiving the angular velocity output from the two-dimensional accelerometer, and processing the image in accordance with the instructions sensed from the encoded to deblur any blurred pixels present in the image in consideration of the angular velocity output.

2 Claims, 2 Drawing Sheets

U.S. PATENT DOCUMENTS

| | | |
|---|---|---|
| 3,701,098 A | 10/1972 | Acker |
| 3,731,062 A | 5/1973 | Reilly, Jr. |
| 3,735,350 A | 5/1973 | Lemelson |
| 3,737,629 A | 6/1973 | See |
| 3,748,939 A | 7/1973 | Feinstein et al. |
| 3,760,162 A | 9/1973 | Holter |
| 3,778,541 A | 12/1973 | Bowker |
| 3,852,572 A | 12/1974 | Nicoud |
| 3,857,019 A | 12/1974 | Holtey |
| 3,866,217 A | 2/1975 | Bennett, Jr. |
| 3,893,173 A | 7/1975 | Taggart et al. |
| 3,896,691 A | 7/1975 | Granger et al. |
| 3,916,420 A | 10/1975 | Brown et al. |
| 3,943,563 A | 3/1976 | Lemelson |
| 3,970,803 A | 7/1976 | Kinzie, Jr. et al. |
| 4,000,239 A | 12/1976 | Hamana et al. |
| 4,048,617 A | 9/1977 | Neff |
| 4,088,981 A | 5/1978 | Gott |
| 4,092,654 A | 5/1978 | Alasia |
| 4,161,749 A | 7/1979 | Erlichman |
| 4,173,401 A | 11/1979 | Harvey |
| 4,200,867 A | 4/1980 | Hill |
| 4,213,694 A | 7/1980 | Kuseski |
| 4,234,214 A | 11/1980 | Lee |
| 4,244,006 A | 1/1981 | Kitahara et al. |
| 4,253,476 A | 3/1981 | Sato |
| 4,262,284 A | 4/1981 | Stieff et al. |
| 4,270,853 A | 6/1981 | Hatada et al. |
| 4,402,150 A | 9/1983 | Sullivan |
| 4,414,316 A | 11/1983 | Conley |
| 4,429,320 A | 1/1984 | Hattori et al. |
| 4,454,517 A | 6/1984 | Kagaya |
| 4,455,609 A | 6/1984 | Inamura et al. |
| 4,463,359 A | 7/1984 | Ayata et al. |
| 4,488,563 A | 12/1984 | Morifuji et al. |
| 4,494,862 A | 1/1985 | Tanaka |
| 4,494,864 A | 1/1985 | Smith et al. |
| 4,500,183 A | 2/1985 | Tanikawa |
| 4,500,919 A | 2/1985 | Schreiber |
| 4,511,907 A | 4/1985 | Fukuchi |
| 4,534,142 A | 8/1985 | Drefahl |
| 4,546,434 A | 10/1985 | Gioello |
| 4,558,326 A | 12/1985 | Kimura et al. |
| 4,580,721 A | 4/1986 | Coffee et al. |
| 4,581,710 A | 4/1986 | Hasselmeier |
| 4,592,938 A | 6/1986 | Benoit |
| 4,596,039 A | 6/1986 | Mitchell et al. |
| 4,632,585 A | 12/1986 | Oyamatsu et al. |
| 4,639,738 A | 1/1987 | Young et al. |
| 4,640,529 A | 2/1987 | Katz |
| 4,641,980 A | 2/1987 | Matsumoto |
| 4,652,935 A | 3/1987 | Endoh et al. |
| 4,665,556 A | 5/1987 | Fukushima et al. |
| 4,683,477 A | 7/1987 | Braun et al. |
| 4,688,105 A | 8/1987 | Bloch et al. |
| 4,689,642 A | 8/1987 | Sugitani |
| 4,689,683 A | 8/1987 | Efron |
| 4,692,394 A | 9/1987 | Drexler |
| 4,703,332 A | 10/1987 | Crotti et al. |
| 4,707,713 A | 11/1987 | Ayata et al. |
| 4,724,307 A | 2/1988 | Dutton et al. |
| 4,728,978 A | 3/1988 | Inoue et al. |
| 4,740,269 A | 4/1988 | Berger et al. |
| 4,754,487 A | 6/1988 | Newmuis |
| 4,762,986 A | 8/1988 | Suda et al. |
| 4,771,342 A | 9/1988 | Beesley |
| 4,783,700 A | 11/1988 | Nagane |
| 4,783,823 A | 11/1988 | Tasaki et al. |
| 4,788,563 A | 11/1988 | Omo et al. |
| 4,791,443 A | 12/1988 | Foley et al. |
| 4,796,038 A | 1/1989 | Allen et al. |
| 4,819,395 A | 4/1989 | Sugita et al. |
| 4,833,599 A | 5/1989 | Colwell et al. |
| 4,835,388 A | 5/1989 | Bruml et al. |
| 4,837,628 A | 6/1989 | Sasaki |
| 4,845,770 A | 7/1989 | Koshida |
| 4,853,967 A | 8/1989 | Mandeville |
| 4,860,375 A | 8/1989 | McCubbrey et al. |
| 4,861,031 A | 8/1989 | Simms |
| 4,868,676 A | 9/1989 | Matsuura et al. |
| 4,897,719 A | 1/1990 | Griffin |
| 4,897,724 A | 1/1990 | Veldhuis |
| 4,902,880 A | 2/1990 | Garczynski et al. |
| 4,904,100 A | 2/1990 | Enix |
| 4,914,452 A | 4/1990 | Fukawa |
| 4,937,676 A | 6/1990 | Finelli et al. |
| 4,949,189 A | 8/1990 | Ohmori |
| 4,954,910 A | 9/1990 | Ueno |
| 4,965,596 A | 10/1990 | Nagoshi et al. |
| 4,975,969 A | 12/1990 | Tal |
| 4,977,459 A | 12/1990 | Ebinuma et al. |
| 4,983,996 A | 1/1991 | Kinoshita |
| 4,987,030 A | 1/1991 | Saito et al. |
| 4,991,205 A | 2/1991 | Lemelson |
| 4,993,405 A | 2/1991 | Takamura et al. |
| 4,999,647 A | 3/1991 | Wood et al. |
| 5,005,998 A | 4/1991 | Takanashi et al. |
| 5,009,626 A | 4/1991 | Katz |
| 5,016,112 A | 5/1991 | Nakajima et al. |
| 5,018,072 A | 5/1991 | Ibamoto et al. |
| 5,021,892 A | 6/1991 | Kita et al. |
| 5,031,049 A | 7/1991 | Toyama et al. |
| 5,035,325 A | 7/1991 | Kitsuki |
| 5,035,929 A | 7/1991 | Myers |
| 5,036,472 A | 7/1991 | Buckley et al. |
| 5,043,748 A | 8/1991 | Katayama et al. |
| 5,049,898 A | 9/1991 | Arthur et al. |
| 5,053,814 A | 10/1991 | Takano et al. |
| 5,058,856 A | 10/1991 | Gordon et al. |
| 5,091,966 A | 2/1992 | Bloomberg et al. |
| 5,101,096 A | 3/1992 | Ohyama et al. |
| 5,103,311 A | 4/1992 | Sluijter et al. |
| 5,107,290 A | 4/1992 | Ohsawa |
| 5,111,288 A | 5/1992 | Blackshear |
| 5,115,888 A | 5/1992 | Schneider |
| 5,119,115 A | 6/1992 | Buat et al. |
| 5,121,139 A | 6/1992 | Burke |
| 5,121,349 A | 6/1992 | Naito |
| 5,124,692 A | 6/1992 | Sasson |
| 5,132,798 A | 7/1992 | Yoshimura et al. |
| 5,134,495 A | 7/1992 | Frazier et al. |
| 5,138,459 A | 8/1992 | Roberts et al. |
| 5,148,534 A | 9/1992 | Comerford |
| 5,151,726 A | 9/1992 | Iwashita et al. |
| 5,153,532 A | 10/1992 | Albers et al. |
| 5,154,956 A | 10/1992 | Fradrich |
| 5,160,577 A | 11/1992 | Deshpande |
| 5,164,827 A | 11/1992 | Paff |
| 5,172,423 A | 12/1992 | France |
| 5,175,808 A | 12/1992 | Sayre |
| 5,179,389 A | 1/1993 | Arai et al. |
| 5,182,548 A | 1/1993 | Haeberli |
| 5,184,169 A | 2/1993 | Nishitani |
| 5,191,640 A | 3/1993 | Plass |
| 5,200,598 A | 4/1993 | Rencontre |
| 5,204,944 A | 4/1993 | Wolberg et al. |
| 5,206,919 A | 4/1993 | Keating |
| 5,208,610 A | 5/1993 | Su et al. |
| 5,216,490 A | 6/1993 | Greiff et al. |
| 5,220,352 A | 6/1993 | Yamamoto et al. |
| 5,220,400 A | 6/1993 | Anderson et al. |
| 5,221,833 A | 6/1993 | Hecht |
| 5,224,179 A | 6/1993 | Denker et al. |
| 5,235,428 A | 8/1993 | Hirota et al. |
| 5,239,292 A | 8/1993 | Willan |
| 5,241,165 A | 8/1993 | Drexler |
| 5,241,372 A | 8/1993 | Ohba |
| 5,243,174 A | 9/1993 | Veeneman et al. |
| 5,243,370 A | 9/1993 | Slater |
| 5,243,381 A | 9/1993 | Hube |
| 5,245,365 A | 9/1993 | Woodard et al. |
| 5,247,611 A | 9/1993 | Norden-Paul et al. |
| 5,260,735 A | 11/1993 | Ishikawa et al. |
| 5,266,781 A | 11/1993 | Warwick et al. |
| 5,275,877 A | 1/1994 | Isayev |
| 5,276,472 A | 1/1994 | Bell et al. |
| 5,278,608 A | 1/1994 | Taylor et al. |

| | | | | | | |
|---|---|---|---|---|---|---|
| 5,280,160 A | 1/1994 | Yamamoto et al. | | 5,534,900 A | 7/1996 | Ohno et al. |
| 5,282,044 A | 1/1994 | Misawa et al. | | 5,534,962 A | 7/1996 | Zander |
| 5,282,051 A | 1/1994 | Walker | | 5,537,144 A | 7/1996 | Faris |
| 5,288,980 A | 2/1994 | Patel et al. | | 5,537,294 A | 7/1996 | Siwinski |
| 5,301,043 A | 4/1994 | Ichikawa | | 5,539,456 A | 7/1996 | Ishii |
| 5,315,316 A | 5/1994 | Khormaee | | 5,542,487 A | 8/1996 | Schultz et al. |
| 5,317,146 A | 5/1994 | Isobe | | 5,549,740 A | 8/1996 | Takahashi et al. |
| 5,318,370 A | 6/1994 | Nehowig | | 5,552,837 A | 9/1996 | Mankovitz |
| 5,327,260 A | 7/1994 | Shimomae | | 5,554,432 A | 9/1996 | Sandor et al. |
| 5,343,386 A | 8/1994 | Barber | | 5,555,428 A | 9/1996 | Radigan et al. |
| 5,345,505 A | 9/1994 | Pires | | 5,555,496 A | 9/1996 | Tackbary et al. |
| 5,347,403 A | 9/1994 | Uekusa | | 5,557,310 A | 9/1996 | Kurata et al. |
| 5,356,971 A | 10/1994 | Sagawa et al. | | 5,559,714 A | 9/1996 | Banks et al. |
| 5,359,387 A | 10/1994 | Hicks | | 5,559,932 A | 9/1996 | Machida et al. |
| 5,363,212 A | 11/1994 | Taniuchi et al. | | 5,561,604 A | 10/1996 | Buckley et al. |
| 5,365,312 A | 11/1994 | Hillmann et al. | | 5,563,643 A | 10/1996 | Carlotta et al. |
| 5,369,261 A | 11/1994 | Shamir | | 5,563,722 A | 10/1996 | Norris |
| 5,384,899 A | 1/1995 | Amit | | 5,565,900 A | 10/1996 | Cowger et al. |
| 5,392,365 A | 2/1995 | Steinkirchner | | 5,566,906 A | 10/1996 | Kamada et al. |
| 5,396,286 A | 3/1995 | Ishizuka | | 5,570,130 A | 10/1996 | Horii et al. |
| 5,398,063 A | 3/1995 | Yamana | | 5,570,435 A | 10/1996 | Bloomberg et al. |
| 5,398,131 A | 3/1995 | Hall et al. | | 5,572,310 A | 11/1996 | Hoberock et al. |
| 5,398,315 A | 3/1995 | Johnson et al. | | 5,572,596 A | 11/1996 | Wildes et al. |
| 5,402,527 A | 3/1995 | Bigby et al. | | 5,572,635 A | 11/1996 | Takizawa et al. |
| 5,412,197 A | 5/1995 | Smith | | 5,576,783 A | 11/1996 | Lee |
| 5,412,402 A | 5/1995 | Searby et al. | | 5,579,116 A | 11/1996 | Sugiyama et al. |
| 5,414,529 A | 5/1995 | Terada et al. | | 5,579,445 A | 11/1996 | Loce et al. |
| 5,420,607 A | 5/1995 | Miller et al. | | 5,581,773 A | 12/1996 | Glover |
| 5,420,635 A | 5/1995 | Konishi et al. | | 5,583,971 A | 12/1996 | Lo |
| 5,428,423 A | 6/1995 | Clark | | 5,587,740 A | 12/1996 | Brennan |
| 5,432,896 A | 7/1995 | Hwong et al. | | 5,592,237 A | 1/1997 | Greenway et al. |
| 5,434,618 A | 7/1995 | Hayashi et al. | | 5,592,597 A | 1/1997 | Kiss |
| 5,434,621 A | 7/1995 | Yu | | 5,594,500 A | 1/1997 | Tanaka et al. |
| 5,436,657 A | 7/1995 | Fukuoka | | 5,598,202 A | 1/1997 | Peterson |
| 5,438,359 A | 8/1995 | Aoki et al. | | 5,598,242 A * | 1/1997 | Omi et al. ...................... 396/55 |
| 5,438,430 A | 8/1995 | Mackinlay et al. | | 5,600,402 A | 2/1997 | Kainen |
| 5,442,188 A | 8/1995 | Brimbal et al. | | 5,602,377 A | 2/1997 | Beller et al. |
| 5,442,567 A | 8/1995 | Small | | 5,602,412 A | 2/1997 | Suzuki et al. |
| 5,444,230 A | 8/1995 | Baldwin et al. | | 5,604,537 A | 2/1997 | Yamazaki et al. |
| 5,444,543 A | 8/1995 | Sakano | | 5,606,420 A | 2/1997 | Maeda et al. |
| 5,450,365 A | 9/1995 | Adachi et al. | | 5,610,761 A | 3/1997 | Ishibashi et al. |
| 5,452,033 A | 9/1995 | Balling et al. | | 5,613,175 A | 3/1997 | Frankel |
| 5,457,515 A | 10/1995 | Quadracci et al. | | 5,615,123 A | 3/1997 | Davidson et al. |
| 5,457,554 A | 10/1995 | Faris | | 5,619,030 A | 4/1997 | Shiomi |
| 5,459,819 A | 10/1995 | Watkins et al. | | 5,619,622 A | 4/1997 | Audi et al. |
| 5,461,440 A | 10/1995 | Toyoda et al. | | 5,619,737 A | 4/1997 | Horning et al. |
| 5,462,375 A | 10/1995 | Isobe et al. | | 5,621,524 A | 4/1997 | Mitani |
| 5,463,470 A | 10/1995 | Terashita et al. | | 5,621,545 A | 4/1997 | Motta et al. |
| 5,465,163 A | 11/1995 | Yoshihara et al. | | 5,621,868 A | 4/1997 | Mizutani et al. |
| 5,466,918 A | 11/1995 | Ray et al. | | 5,624,732 A | 4/1997 | Oshima et al. |
| 5,467,118 A | 11/1995 | Gragg et al. | | 5,625,770 A | 4/1997 | Nomura |
| 5,475,318 A | 12/1995 | Marcus et al. | | 5,633,678 A | 5/1997 | Parulski et al. |
| 5,477,264 A | 12/1995 | Sarbadhikari et al. | | 5,634,730 A | 6/1997 | Bobry |
| 5,479,015 A | 12/1995 | Rudman et al. | | 5,638,103 A | 6/1997 | Obata et al. |
| 5,482,389 A | 1/1996 | Bickoff et al. | | 5,642,226 A | 6/1997 | Rosenthal |
| 5,483,379 A | 1/1996 | Svanberg et al. | | 5,644,341 A | 7/1997 | Fujii et al. |
| 5,488,223 A | 1/1996 | Austin et al. | | 5,644,431 A | 7/1997 | Magee |
| 5,489,935 A | 2/1996 | Dornier | | 5,644,557 A | 7/1997 | Akamine et al. |
| 5,489,995 A | 2/1996 | Iso et al. | | 5,646,658 A | 7/1997 | Thiel et al. |
| 5,493,409 A | 2/1996 | Maeda et al. | | 5,652,918 A * | 7/1997 | Usui ................................ 396/55 |
| 5,495,568 A | 2/1996 | Beavin | | 5,666,226 A | 9/1997 | Ezra et al. |
| 5,502,485 A | 3/1996 | Suzuki | | 5,666,411 A | 9/1997 | McCarty |
| 5,502,529 A | 3/1996 | Zander | | 5,678,081 A | 10/1997 | Tanaka |
| 5,502,577 A | 3/1996 | Mackinlay et al. | | 5,679,456 A | 10/1997 | Sakai et al. |
| 5,506,603 A | 4/1996 | Kawano et al. | | 5,682,191 A | 10/1997 | Barrett et al. |
| 5,506,620 A | 4/1996 | Ozawa | | 5,687,304 A | 11/1997 | Kiss |
| 5,512,951 A | 4/1996 | Torii | | 5,688,056 A | 11/1997 | Peyret |
| 5,513,117 A | 4/1996 | Small | | 5,689,740 A | 11/1997 | Uchiyama |
| 5,515,101 A | 5/1996 | Yoshida | | 5,692,225 A | 11/1997 | Bernardi et al. |
| 5,515,104 A | 5/1996 | Okada | | 5,696,892 A | 12/1997 | Redmann et al. |
| 5,517,222 A | 5/1996 | Sugiyama et al. | | 5,697,006 A | 12/1997 | Toguchi et al. |
| 5,517,241 A | 5/1996 | Adachi et al. | | 5,703,961 A | 12/1997 | Rogina et al. |
| 5,521,372 A | 5/1996 | Hecht et al. | | 5,706,049 A | 1/1998 | Moghadam et al. |
| 5,521,710 A | 5/1996 | Strossman | | 5,708,900 A | 1/1998 | Yokoyama et al. |
| 5,523,780 A | 6/1996 | Hirosawa et al. | | 5,710,582 A | 1/1998 | Hawkins et al. |
| 5,524,194 A | 6/1996 | Chida et al. | | 5,710,948 A | 1/1998 | Takagi |
| 5,528,339 A | 6/1996 | Buhr et al. | | 5,715,228 A | 2/1998 | Takiguchi |
| 5,529,279 A | 6/1996 | Beatty et al. | | 5,715,325 A | 2/1998 | Bang et al. |
| 5,533,172 A | 7/1996 | Hurtz et al. | | 5,717,197 A | 2/1998 | Petrie |

| | | |
|---|---|---|
| 5,719,621 A | 2/1998 | Tsunefuji |
| 5,719,970 A | 2/1998 | Aoki et al. |
| 5,726,435 A | 3/1998 | Hara et al. |
| 5,726,693 A | 3/1998 | Sharma et al. |
| 5,729,252 A | 3/1998 | Fraser |
| 5,729,471 A | 3/1998 | Jain et al. |
| 5,731,062 A | 3/1998 | Kim et al. |
| 5,734,154 A | 3/1998 | Jachimowicz et al. |
| 5,734,425 A | 3/1998 | Takizawa et al. |
| 5,742,305 A | 4/1998 | Hackleman |
| 5,745,175 A | 4/1998 | Anderson et al. |
| 5,748,228 A | 5/1998 | Kobayashi et al. |
| 5,748,326 A | 5/1998 | Thompson-Bell et al. |
| 5,748,764 A | 5/1998 | Benati et al. |
| 5,748,856 A | 5/1998 | Cariffe et al. |
| 5,750,974 A | 5/1998 | Sasaki et al. |
| 5,751,303 A | 5/1998 | Erickson et al. |
| 5,751,318 A | 5/1998 | Granzow |
| 5,751,590 A | 5/1998 | Cannon et al. |
| 5,752,114 A | 5/1998 | Saito et al. |
| 5,753,344 A | 5/1998 | Jacobsen |
| 5,754,227 A | 5/1998 | Fukuoka |
| 5,754,690 A | 5/1998 | Jackson et al. |
| 5,754,700 A | 5/1998 | Kuzma |
| 5,755,519 A | 5/1998 | Klinefelter |
| 5,756,978 A | 5/1998 | Soltesz et al. |
| 5,757,388 A | 5/1998 | Stephenson |
| 5,757,393 A | 5/1998 | Suzuki |
| 5,760,814 A | 6/1998 | Kang |
| 5,761,726 A | 6/1998 | Guttag et al. |
| 5,767,945 A | 6/1998 | Fields et al. |
| 5,768,482 A | 6/1998 | Winter et al. |
| 5,768,609 A | 6/1998 | Gove et al. |
| 5,771,245 A | 6/1998 | Zhang |
| 5,777,626 A | 7/1998 | Takashima et al. |
| 5,781,708 A | 7/1998 | Austin et al. |
| 5,781,924 A | 7/1998 | Zaitzeva et al. |
| 5,784,088 A | 7/1998 | Ujita et al. |
| 5,784,521 A | 7/1998 | Nakatani et al. |
| 5,787,193 A | 7/1998 | Balasubramanian |
| 5,788,388 A | 8/1998 | Cowger et al. |
| 5,790,193 A | 8/1998 | Ohmori |
| 5,790,699 A | 8/1998 | Jackson et al. |
| 5,792,249 A | 8/1998 | Shirota et al. |
| 5,796,429 A | 8/1998 | Suzuki et al. |
| 5,801,854 A | 9/1998 | Naylor, Jr. |
| 5,805,213 A | 9/1998 | Spaulding et al. |
| 5,805,296 A | 9/1998 | Hattori et al. |
| 5,805,550 A | 9/1998 | Ohmori |
| 5,809,292 A | 9/1998 | Wilkinson et al. |
| 5,812,071 A | 9/1998 | Kairouz |
| 5,812,156 A | 9/1998 | Bullock et al. |
| 5,815,186 A | 9/1998 | Lewis et al. |
| 5,818,023 A | 10/1998 | Meyerson et al. |
| 5,818,032 A | 10/1998 | Sun et al. |
| 5,819,240 A | 10/1998 | Kara |
| 5,819,662 A | 10/1998 | Koyabu |
| 5,822,606 A | 10/1998 | Morton |
| 5,822,608 A | 10/1998 | Dieffenderfer et al. |
| 5,824,410 A | 10/1998 | Sakai et al. |
| 5,825,383 A | 10/1998 | Abe et al. |
| 5,825,882 A | 10/1998 | Kowalski et al. |
| 5,825,947 A | 10/1998 | Sasaki et al. |
| 5,826,333 A | 10/1998 | Iketani et al. |
| 5,835,136 A | 11/1998 | Watanabe et al. |
| 5,835,616 A | 11/1998 | Lobo et al. |
| 5,835,641 A | 11/1998 | Sotoda et al. |
| 5,838,331 A | 11/1998 | Debry |
| 5,838,458 A | 11/1998 | Tsai |
| 5,841,441 A | 11/1998 | Smith |
| 5,845,166 A | 12/1998 | Fellegara et al. |
| 5,847,836 A | 12/1998 | Suzuki |
| 5,848,255 A | 12/1998 | Kondo |
| 5,850,234 A | 12/1998 | Kneezel et al. |
| 5,852,502 A | 12/1998 | Beckett |
| 5,852,673 A | 12/1998 | Young et al. |
| 5,854,648 A | 12/1998 | Hanabusa |
| 5,854,882 A | 12/1998 | Wang |
| 5,859,921 A | 1/1999 | Suzuki |
| 5,860,036 A | 1/1999 | Stephenson |
| 5,860,363 A | 1/1999 | Childers et al. |
| 5,864,630 A | 1/1999 | Cosatto et al. |
| 5,866,253 A | 2/1999 | Philipps et al. |
| 5,867,213 A | 2/1999 | Ouchi |
| 5,867,394 A | 2/1999 | LaDue et al. |
| 5,870,102 A | 2/1999 | Tarolli et al. |
| 5,872,594 A | 2/1999 | Thompon |
| 5,874,836 A | 2/1999 | Nowak et al. |
| 5,875,034 A | 2/1999 | Shintani et al. |
| 5,878,292 A | 3/1999 | Bell et al. |
| 5,881,211 A | 3/1999 | Matsumura |
| 5,884,013 A | 3/1999 | Bosschaerts et al. |
| 5,884,118 A | 3/1999 | Mestha et al. |
| 5,886,371 A | 3/1999 | Shinagawa |
| 5,894,309 A | 4/1999 | Freeman et al. |
| 5,894,326 A | 4/1999 | McIntyre et al. |
| 5,896,155 A | 4/1999 | Lebens et al. |
| 5,896,169 A | 4/1999 | Boelart |
| 5,896,176 A | 4/1999 | Das et al. |
| 5,896,403 A | 4/1999 | Nagasaki et al. |
| 5,900,909 A | 5/1999 | Parulski et al. |
| 5,905,529 A | 5/1999 | Inuiya et al. |
| 5,907,354 A | 5/1999 | Cama et al. |
| 5,907,415 A | 5/1999 | Yabe |
| 5,907,434 A | 5/1999 | Sekine et al. |
| 5,909,227 A | 6/1999 | Silverbrook |
| 5,909,248 A | 6/1999 | Stephenson |
| 5,909,562 A | 6/1999 | Faget et al. |
| 5,911,056 A | 6/1999 | Faget et al. |
| 5,914,748 A | 6/1999 | Parulski et al. |
| 5,914,801 A | 6/1999 | Dhuler et al. |
| 5,916,358 A | 6/1999 | Bagchi et al. |
| 5,917,542 A | 6/1999 | Moghadam et al. |
| 5,917,937 A | 6/1999 | Szeliski et al. |
| 5,917,963 A | 6/1999 | Miyake |
| 5,921,686 A | 7/1999 | Baird et al. |
| 5,923,406 A | 7/1999 | Brasington et al. |
| 5,923,882 A | 7/1999 | Ho et al. |
| 5,924,737 A | 7/1999 | Schrupp |
| 5,930,528 A | 7/1999 | Ito et al. |
| 5,933,137 A | 8/1999 | Anderson et al. |
| 5,933,179 A | 8/1999 | Fogle et al. |
| 5,937,089 A | 8/1999 | Kobayashi |
| 5,938,766 A | 8/1999 | Anderson et al. |
| 5,940,095 A | 8/1999 | Parish et al. |
| 5,949,426 A | 9/1999 | Rich |
| 5,949,459 A | 9/1999 | Gasvoda et al. |
| 5,949,467 A | 9/1999 | Gunther et al. |
| 5,949,967 A | 9/1999 | Spaulding et al. |
| 5,955,817 A | 9/1999 | Dhuler et al. |
| 5,956,163 A | 9/1999 | Clarke et al. |
| 5,959,943 A | 9/1999 | Yonezawa |
| 5,960,412 A | 9/1999 | Tackbary et al. |
| RE36,338 E | 10/1999 | Fukuoka |
| 5,963,104 A | 10/1999 | Buer |
| 5,964,156 A | 10/1999 | Smith et al. |
| 5,966,134 A | 10/1999 | Arias |
| 5,966,553 A | 10/1999 | Nishitani et al. |
| 5,969,322 A | 10/1999 | Mori et al. |
| 5,973,751 A | 10/1999 | Ishida et al. |
| 5,974,168 A | 10/1999 | Rushmeier et al. |
| 5,974,190 A | 10/1999 | Maeda et al. |
| 5,974,234 A | 10/1999 | Levine et al. |
| 5,974,238 A | 10/1999 | Chase, Jr. |
| 5,977,982 A | 11/1999 | Lauzon |
| 5,978,511 A | 11/1999 | Horiuchi et al. |
| 5,978,609 A | 11/1999 | Aoki |
| 5,980,010 A | 11/1999 | Stephenson |
| 5,982,378 A | 11/1999 | Kato |
| 5,982,424 A | 11/1999 | Simerly et al. |
| 5,986,671 A | 11/1999 | Fredlund et al. |
| 5,986,698 A | 11/1999 | Nobuoka |
| 5,986,706 A | 11/1999 | Hirasawa |
| 5,986,718 A | 11/1999 | Barwacz et al. |
| 5,989,678 A | 11/1999 | Jacobson |
| 5,990,973 A | 11/1999 | Sakamoto |
| 5,991,429 A | 11/1999 | Coffin et al. |
| 5,991,865 A | 11/1999 | Longhenry et al. |

| | | | |
|---|---|---|---|
| 5,992,994 A | 11/1999 | Rasmussen et al. | |
| 5,995,772 A | 11/1999 | Barry et al. | |
| 5,996,893 A | 12/1999 | Soscia | |
| 5,997,124 A | 12/1999 | Capps et al. | |
| 5,999,190 A | 12/1999 | Sheasby et al. | |
| 5,999,203 A | 12/1999 | Cane et al. | |
| 5,999,697 A | 12/1999 | Murase et al. | |
| 6,000,773 A | 12/1999 | Murray et al. | |
| 6,000,791 A | 12/1999 | Scheffelin et al. | |
| 6,005,582 A | 12/1999 | Gabriel et al. | |
| 6,006,039 A | 12/1999 | Steinberg et al. | |
| 6,009,188 A | 12/1999 | Cohen et al. | |
| 6,011,536 A | 1/2000 | Hertzmann et al. | |
| 6,011,585 A | 1/2000 | Anderson | |
| 6,011,937 A | 1/2000 | Chaussade et al. | |
| 6,014,165 A | 1/2000 | McIntyre et al. | |
| 6,014,170 A | 1/2000 | Pont et al. | |
| RE36,589 E | 2/2000 | Akamine et al. | |
| 6,020,898 A | 2/2000 | Saito et al. | |
| 6,020,931 A | 2/2000 | Bilbrey et al. | |
| 6,022,099 A | 2/2000 | Chwalek et al. | |
| 6,023,757 A | 2/2000 | Nishimoto et al. | |
| 6,028,611 A | 2/2000 | Anderson et al. | |
| 6,033,137 A | 3/2000 | Ito | |
| 6,034,740 A | 3/2000 | Mitsui et al. | |
| 6,038,491 A | 3/2000 | McGarry et al. | |
| 6,042,213 A | 3/2000 | Hayasaki | |
| 6,043,821 A | 3/2000 | Sprague et al. | |
| 6,046,768 A | 4/2000 | Kaneda et al. | |
| 6,047,130 A | 4/2000 | Oles | |
| 6,052,648 A | 4/2000 | Burfeind et al. | |
| 6,056,286 A | 5/2000 | Koga | |
| 6,057,850 A | 5/2000 | Kichury | |
| 6,061,179 A | 5/2000 | Inoguchi et al. | |
| 6,062,667 A | 5/2000 | Matsui et al. | |
| 6,069,642 A | 5/2000 | Isobe | |
| 6,074,042 A | 6/2000 | Gasvoda et al. | |
| 6,078,758 A | 6/2000 | Patton et al. | |
| 6,084,713 A | 7/2000 | Rosenthal | |
| 6,094,221 A | 7/2000 | Andersion | |
| 6,094,282 A | 7/2000 | Hoda et al. | |
| 6,097,431 A | 8/2000 | Anderson et al. | |
| 6,102,505 A | 8/2000 | McIntyre et al. | |
| 6,104,430 A | 8/2000 | Fukuoka | |
| 6,106,147 A | 8/2000 | Silverbrook | |
| 6,111,605 A | 8/2000 | Suzuki | |
| 6,118,484 A | 9/2000 | Yokota et al. | |
| 6,118,554 A | 9/2000 | Horaguchi | |
| 6,122,403 A | 9/2000 | Rhoads | |
| 6,133,951 A | 10/2000 | Miyadera | |
| 6,134,030 A | 10/2000 | Kaneko et al. | |
| 6,134,339 A | 10/2000 | Luo | |
| 6,134,353 A | 10/2000 | Makram-Ebeid | |
| 6,135,586 A | 10/2000 | McClelland et al. | |
| 6,136,212 A | 10/2000 | Mastrangelo et al. | |
| 6,137,509 A | 10/2000 | Hayasaki | |
| 6,137,521 A | 10/2000 | Matsui | |
| 6,141,036 A | 10/2000 | Katayama et al. | |
| 6,141,431 A | 10/2000 | Munetsugu et al. | |
| 6,144,414 A | 11/2000 | Toba | |
| 6,145,025 A | 11/2000 | Lim | |
| 6,147,704 A | 11/2000 | Ito et al. | |
| 6,149,256 A | 11/2000 | McIntyre et al. | |
| 6,157,394 A | 12/2000 | Anderson et al. | |
| 6,161,915 A | 12/2000 | Bolash et al. | |
| 6,163,340 A | 12/2000 | Yasuda | |
| 6,163,361 A | 12/2000 | McIntyre et al. | |
| 6,166,832 A | 12/2000 | Fujimoto | |
| 6,167,806 B1 | 1/2001 | Chretinat et al. | |
| 6,172,706 B1 | 1/2001 | Tasumi | |
| 6,178,883 B1 | 1/2001 | Satoh et al. | |
| 6,181,377 B1 | 1/2001 | Kobayashi | |
| 6,181,379 B1 | 1/2001 | Kingetsu et al. | |
| 6,182,901 B1 | 2/2001 | Hecht et al. | |
| 6,188,430 B1 | 2/2001 | Motai | |
| 6,188,431 B1 | 2/2001 | Oie | |
| 6,196,541 B1 | 3/2001 | Silverbrook | |
| 6,198,489 B1 | 3/2001 | Salesin et al. | |
| 6,199,874 B1 | 3/2001 | Galvin et al. | |
| 6,199,969 B1 | 3/2001 | Haflinger et al. | |
| 6,201,571 B1 | 3/2001 | Ota | |
| 6,203,147 B1 | 3/2001 | Battey et al. | |
| 6,204,877 B1 | 3/2001 | Kiyokawa | |
| 6,211,911 B1 | 4/2001 | Komiya et al. | |
| 6,213,588 B1 | 4/2001 | Silverbrook | |
| 6,217,165 B1 | 4/2001 | Silverbrook | |
| 6,222,452 B1 | 4/2001 | Ahlstrom et al. | |
| 6,226,015 B1 | 5/2001 | Danneels | |
| 6,227,643 B1 | 5/2001 | Purcell et al. | |
| 6,229,565 B1 | 5/2001 | Bobry | |
| 6,233,014 B1 * | 5/2001 | Ochi et al. | 348/324 |
| 6,234,392 B1 | 5/2001 | Murakami | |
| 6,234,608 B1 | 5/2001 | Genovese et al. | |
| 6,236,431 B1 | 5/2001 | Hirasawa et al. | |
| 6,238,044 B1 | 5/2001 | Silverbrook | |
| 6,252,976 B1 | 6/2001 | Schildkraut et al. | |
| 6,260,137 B1 | 7/2001 | Fleck et al. | |
| 6,262,769 B1 | 7/2001 | Anderson et al. | |
| 6,270,177 B1 | 8/2001 | King et al. | |
| 6,273,535 B1 | 8/2001 | Inoue et al. | |
| 6,278,481 B1 | 8/2001 | Schmidt | |
| 6,278,486 B1 | 8/2001 | Hieda et al. | |
| 6,278,491 B1 | 8/2001 | Wang et al. | |
| 6,280,106 B1 | 8/2001 | Juan et al. | |
| 6,285,410 B1 | 9/2001 | Marai | |
| 6,290,334 B1 | 9/2001 | Ishinaga et al. | |
| 6,292,574 B1 | 9/2001 | Schildkraut et al. | |
| 6,294,101 B1 | 9/2001 | Silverbrook | |
| 6,297,872 B1 | 10/2001 | Inamura et al. | |
| 6,300,976 B1 | 10/2001 | Fukuoka | |
| 6,304,291 B1 | 10/2001 | Silverbrook | |
| 6,304,684 B1 | 10/2001 | Niczyporuk et al. | |
| 6,304,825 B1 | 10/2001 | Nowak et al. | |
| 6,305,775 B1 | 10/2001 | Ohtsuka et al. | |
| 6,317,156 B1 | 11/2001 | Nagasaki et al. | |
| 6,317,192 B1 | 11/2001 | Silverbrook et al. | |
| 6,323,912 B1 | 11/2001 | McIntyre | |
| 6,325,380 B1 | 12/2001 | Feigl et al. | |
| 6,328,395 B1 | 12/2001 | Kitahara et al. | |
| 6,334,587 B1 | 1/2002 | Roder | |
| 6,357,865 B1 | 3/2002 | Kubby et al. | |
| 6,359,650 B1 | 3/2002 | Murakami | |
| 6,362,868 B1 | 3/2002 | Silverbrook | |
| 6,375,301 B1 | 4/2002 | Childers et al. | |
| 6,375,314 B1 | 4/2002 | Reed et al. | |
| 6,378,997 B1 | 4/2002 | Nitta | |
| 6,386,772 B1 | 5/2002 | Klinefelter et al. | |
| 6,390,589 B1 | 5/2002 | Imanaka et al. | |
| 6,407,777 B1 | 6/2002 | DeLuca | |
| 6,416,152 B1 | 7/2002 | Matsuzaki et al. | |
| 6,421,050 B1 | 7/2002 | Ruml et al. | |
| 6,425,661 B1 | 7/2002 | Silverbrook et al. | |
| 6,431,669 B1 | 8/2002 | Silverbrook | |
| 6,442,525 B1 | 8/2002 | Silverbrook et al. | |
| 6,472,052 B1 | 10/2002 | Silverbrook | |
| 6,489,990 B1 | 12/2002 | Popovich | |
| 6,493,031 B1 | 12/2002 | Washizawa | |
| 6,530,519 B1 | 3/2003 | Suzuki | |
| 6,543,880 B1 | 4/2003 | Akhavain et al. | |
| 6,546,187 B1 | 4/2003 | Miyazaki et al. | |
| 6,552,821 B1 | 4/2003 | Suzuki | |
| 6,573,927 B2 | 6/2003 | Parulski et al. | |
| 6,597,394 B1 | 7/2003 | Duncan et al. | |
| 6,606,171 B1 | 8/2003 | Renk et al. | |
| 6,618,091 B1 | 9/2003 | Tamura | |
| 6,628,333 B1 | 9/2003 | Gowda et al. | |
| 6,633,332 B1 | 10/2003 | Nay et al. | |
| 6,634,814 B2 | 10/2003 | Spurr et al. | |
| 6,636,216 B1 | 10/2003 | Silverbrook et al. | |
| 6,640,004 B2 | 10/2003 | Katayama et al. | |
| 6,655,776 B2 | 12/2003 | Murray | |
| 6,665,454 B1 | 12/2003 | Silverbrook et al. | |
| 6,670,985 B2 | 12/2003 | Karube et al. | |
| 6,702,417 B2 | 3/2004 | Silverbrook | |
| 6,727,948 B1 | 4/2004 | Silverbrook | |
| 6,727,951 B1 | 4/2004 | Silverbrook | |
| 6,736,321 B2 | 5/2004 | Tsikos et al. | |
| 6,738,903 B1 | 5/2004 | Haines | |

| | | |
|---|---|---|
| 6,744,526 B2 | 6/2004 | McDermott et al. |
| 6,745,331 B1 | 6/2004 | Silverbrook |
| 6,749,301 B2 | 6/2004 | Silverbrook et al. |
| 6,750,901 B1 | 6/2004 | Silverbrook |
| 6,750,944 B2 | 6/2004 | Silverbrook et al. |
| 6,773,874 B2 | 8/2004 | Silverbrook |
| 6,788,336 B1 | 9/2004 | Silverbrook |
| 6,791,605 B1 | 9/2004 | Reele et al. |
| 6,803,989 B2 | 10/2004 | Silverbrook |
| 6,820,968 B2 | 11/2004 | Silverbrook |
| 6,831,681 B1 | 12/2004 | Silverbrook |
| 6,837,635 B1 | 1/2005 | Juan |
| 6,858,837 B2 | 2/2005 | Tabata |
| 6,870,566 B1 | 3/2005 | Koide et al. |
| 6,879,341 B1 | 4/2005 | Silverbrook |
| 6,888,649 B2 | 5/2005 | Suzuki |
| 6,909,456 B1 | 6/2005 | Sasaki |
| 6,913,875 B2 | 7/2005 | Silverbrook |
| 6,918,542 B2 | 7/2005 | Silverbrook et al. |
| 6,918,654 B2 | 7/2005 | Silverbrook |
| 6,948,661 B2 | 9/2005 | Silverbrook et al. |
| 6,953,235 B2 | 10/2005 | Silverbrook |
| 6,954,254 B2 | 10/2005 | Silverbrook |
| 6,958,207 B1 | 10/2005 | Khusnatdinov et al. |
| 6,985,207 B2 | 1/2006 | Silverbrook |
| 7,044,589 B2 | 5/2006 | Silverbrook |
| 7,050,143 B1 | 5/2006 | Silverbrook et al. |
| 7,058,219 B2 | 6/2006 | Walmsley et al. |
| 7,063,940 B2 | 6/2006 | Silverbrook |
| 7,077,515 B2 | 7/2006 | Silverbrook |
| 7,083,108 B2 | 8/2006 | Silverbrook et al. |
| 7,084,951 B2 | 8/2006 | Silverbrook |
| 7,086,724 B2 | 8/2006 | Silverbrook |
| 7,092,011 B2 | 8/2006 | Silverbrook et al. |
| 7,097,263 B2 | 8/2006 | Silverbrook |
| 7,110,024 B1 | 9/2006 | Silverbrook et al. |
| 7,110,139 B2 | 9/2006 | Silverbrook |
| 7,119,836 B2 | 10/2006 | Silverbrook |
| 7,140,723 B2 | 11/2006 | Silverbrook |
| 7,140,726 B2 | 11/2006 | Silverbrook |
| 7,156,512 B2 | 1/2007 | Silverbrook |
| 7,173,729 B2 | 2/2007 | Silverbrook et al. |
| 7,186,499 B2 | 3/2007 | Silverbrook |
| 7,187,404 B2 | 3/2007 | Silverbrook et al. |
| 7,234,645 B2 | 6/2007 | Silverbrook et al. |
| 7,234,801 B2 | 6/2007 | Silverbrook |
| 7,250,975 B2 | 7/2007 | Silverbrook |
| 7,278,723 B2 | 10/2007 | Silverbrook |
| 7,284,843 B2 | 10/2007 | Silverbrook |
| 7,291,447 B2 | 11/2007 | Silverbrook |
| 7,312,845 B2 | 12/2007 | Silverbrook |
| 7,357,497 B2 | 4/2008 | Silverbrook et al. |
| 7,377,706 B2 | 5/2008 | Silverbrook et al. |
| 7,385,639 B2 | 6/2008 | Silverbrook |
| 7,404,633 B2 | 7/2008 | Silverbrook et al. |
| 7,443,434 B2 | 10/2008 | Silverbrook |
| 7,452,048 B2 | 11/2008 | Silverbrook |
| 7,453,492 B2 | 11/2008 | Silverbrook |
| 7,483,053 B2 | 1/2009 | Silverbrook |
| 7,505,068 B2 | 3/2009 | Silverbrook |
| 7,517,071 B2 | 4/2009 | Silverbrook |
| 7,524,045 B2 | 4/2009 | Silverbrook et al. |
| 7,525,687 B2 | 4/2009 | Silverbrook |
| 7,557,853 B2 | 7/2009 | Silverbrook |
| 7,575,313 B2 | 8/2009 | Silverbrook |
| 7,576,794 B2 | 8/2009 | Silverbrook |
| 7,576,795 B2 | 8/2009 | Silverbrook |
| 7,581,826 B2 | 9/2009 | Silverbrook |
| 7,590,347 B2 | 9/2009 | Silverbrook |
| 7,602,423 B2 | 10/2009 | Silverbrook |
| 7,621,607 B2 | 11/2009 | Silverbrook |
| 7,629,999 B2 | 12/2009 | Silverbrook |
| 7,633,535 B2 | 12/2009 | Silverbrook |
| 7,637,594 B2 | 12/2009 | Silverbrook et al. |
| 7,646,403 B2 | 1/2010 | Silverbrook et al. |
| 7,654,626 B2 | 2/2010 | Silverbrook et al. |
| 7,665,834 B2 | 2/2010 | Silverbrook |
| 7,690,765 B2 | 4/2010 | Silverbrook |
| 7,695,108 B2 | 4/2010 | Silverbrook |
| 7,701,506 B2 | 4/2010 | Silverbrook |
| 7,703,910 B2 | 4/2010 | Silverbrook |
| 7,724,282 B2 | 5/2010 | Silverbrook |
| 7,742,696 B2 | 6/2010 | Silverbrook |
| 7,750,971 B2 | 7/2010 | Silverbrook |
| 7,758,166 B2 | 7/2010 | Silverbrook |
| 7,773,125 B2 | 8/2010 | Silverbrook et al. |
| 7,796,166 B2 | 9/2010 | Silverbrook |
| 7,905,574 B2 | 3/2011 | Silverbrook |
| 7,907,178 B2 * | 3/2011 | Silverbrook et al. .... 348/208.99 |
| 7,936,395 B2 | 5/2011 | Silverbrook |
| 7,957,009 B2 | 6/2011 | Silverbrook |
| 7,965,416 B2 | 6/2011 | Silverbrook |
| 7,970,275 B2 | 6/2011 | Silverbrook |
| 8,020,979 B2 | 9/2011 | Silverbrook |
| 2001/0007458 A1 | 7/2001 | Purcell et al. |
| 2001/0015760 A1 | 8/2001 | Fellegara et al. |
| 2001/0040574 A1 | 11/2001 | Prater |
| 2002/0024603 A1 | 2/2002 | Nakayama et al. |
| 2002/0033854 A1 | 3/2002 | Silverbrook et al. |
| 2002/0054212 A1 | 5/2002 | Fukuoka |
| 2002/0063760 A1 | 5/2002 | Dietl et al. |
| 2002/0135266 A1 | 9/2002 | Boutaghou |
| 2002/0141750 A1 | 10/2002 | Ludtke et al. |
| 2003/0043273 A1 | 3/2003 | Suzuki |
| 2003/0076551 A1 | 4/2003 | Kawai et al. |
| 2004/0119827 A1 | 6/2004 | Silverbrook et al. |
| 2004/0125209 A1 | 7/2004 | Silverbrook |
| 2004/0196350 A1 | 10/2004 | Silverbrook |
| 2004/0201764 A1 | 10/2004 | Honda et al. |
| 2004/0257446 A1 | 12/2004 | Silverbrook |
| 2005/0088527 A1 | 4/2005 | Silverbrook |
| 2005/0146613 A1 | 7/2005 | Silverbrook et al. |
| 2006/0098232 A1 | 5/2006 | Nakano et al. |
| 2006/0126102 A1 | 6/2006 | Sakuda |
| 2006/0239676 A1 | 10/2006 | Parulski et al. |
| 2007/0024685 A1 | 2/2007 | Silverbrook |
| 2007/0040856 A1 | 2/2007 | Silverbrook |
| 2007/0046754 A1 | 3/2007 | Silverbrook |
| 2008/0002215 A1 | 1/2008 | Silverbrook et al. |
| 2008/0062232 A1 | 3/2008 | Silverbrook |
| 2008/0152414 A1 | 6/2008 | Silverbrook |
| 2008/0252732 A1 | 10/2008 | Silverbrook et al. |
| 2009/0052879 A1 | 2/2009 | Silverbrook |
| 2009/0141291 A1 | 6/2009 | Yumiki et al. |
| 2009/0207208 A1 | 8/2009 | Silverbrook et al. |
| 2009/0244292 A1 | 10/2009 | Silverbrook et al. |

FOREIGN PATENT DOCUMENTS

| | | |
|---|---|---|
| EP | 0332787 A1 | 9/1989 |
| EP | 0354581 A2 | 2/1990 |
| EP | 0382044 A2 | 8/1990 |
| EP | 0398295 A2 | 11/1990 |
| EP | 0408241 A2 | 1/1991 |
| EP | 0430692 A1 | 5/1991 |
| EP | 0438841 A1 | 7/1991 |
| EP | 0512799 A2 | 11/1992 |
| EP | 520289 A2 | 12/1992 |
| EP | 0568357 A2 | 11/1993 |
| EP | 0652108 A2 | 5/1995 |
| EP | 0670555 A1 | 9/1995 |
| EP | 0725364 A2 | 8/1996 |
| EP | 0755162 A2 | 1/1997 |
| EP | 0771101 A2 | 2/1997 |
| EP | 0771102 A2 | 2/1997 |
| EP | 0763930 A1 | 3/1997 |
| EP | 0779736 A2 | 6/1997 |
| EP | 0822078 A2 | 2/1998 |
| GB | 1520594 | 8/1978 |
| GB | 1595797 | 8/1981 |
| GB | 2212481 | 7/1989 |
| GB | 2228579 | 8/1990 |
| GB | 2299787 | 10/1996 |
| JP | 60096067 | 5/1985 |
| JP | 60136480 | 7/1985 |
| JP | 61129740 | 6/1986 |
| JP | 62081164 | 4/1987 |
| JP | 1148587 | 6/1989 |
| JP | 1267254 | 10/1989 |

| | | |
|---|---|---|
| JP | 1277979 | 11/1989 |
| JP | 1292483 | 11/1989 |
| JP | 02096880 | 4/1990 |
| JP | 2178163 | 7/1990 |
| JP | 2241760 | 9/1990 |
| JP | 3011483 | 1/1991 |
| JP | 3127341 | 5/1991 |
| JP | 3227875 | 10/1991 |
| JP | 4200186 | 7/1992 |
| JP | 5056160 | 3/1993 |
| JP | 5108278 | 4/1993 |
| JP | 5137147 | 6/1993 |
| JP | 5208773 | 8/1993 |
| JP | 6086197 | 3/1994 |
| JP | 06-103358 | 4/1994 |
| JP | 6149051 | 5/1994 |
| JP | 6161047 | 6/1994 |
| JP | 6232778 | 8/1994 |
| JP | 6238958 | 8/1994 |
| JP | 7059107 | 3/1995 |
| JP | 7129762 | 5/1995 |
| JP | 7234911 | 9/1995 |
| JP | 7298123 | 11/1995 |
| JP | 8002754 | 1/1996 |
| JP | 9005902 | 1/1997 |
| JP | 9024631 | 1/1997 |
| JP | 09-069064 | 3/1997 |
| JP | 09-071015 | 3/1997 |
| JP | 9065266 | 3/1997 |
| JP | 09-116843 | 5/1997 |
| JP | 9149311 | 6/1997 |
| JP | 09-187040 | 7/1997 |
| JP | 9261382 | 10/1997 |
| JP | 10107981 | 4/1998 |
| WO | 83/03941 | 11/1983 |
| WO | 86/05641 | 9/1986 |
| WO | 87/07741 | 12/1987 |
| WO | 93/04425 | 3/1993 |
| WO | 95/16323 | 6/1995 |
| WO | WO 95/16323 | 6/1995 |
| WO | 96/32265 | 10/1996 |
| WO | 96/32281 | 10/1996 |
| WO | 96/32808 | 10/1996 |
| WO | WO 96/32265 A | 10/1996 |
| WO | 97/05738 | 2/1997 |
| WO | WO 97/06958 A | 2/1997 |
| WO | WO 97/06958 A1 | 2/1997 |
| WO | 03/095224 | 11/2003 |

OTHER PUBLICATIONS

Laurent Petit and Jean-Dither Legat, "VLIW Processor Architecture Adapted to FPAs", May 1998, SPIE, vol. 3410, only p. 128 submitted.
Laurent Petit and Jean-Didier Legat, "VLIW Processor Architecture Adapted to FPAs", May 1998, SPIE, vol. 3410, 99 128.
"Suppliers Focus on Teens", Chain Drug Review, Oct. 9, 2000, vol. 22, No. 17, p. 30, entire document.
Barry Cipra (The Ubiquitous Reed-Solomon Codes: Siam News, vol. 26, No. 1, Jan. 1993).
Chi et al., "Drawing and Animation Using Skeletal Strokes", Computer Graphics, pp. 1-9.
Curtis et al., "Computer-Generated Watercolor", SIGGRAPH Conference Proceedings, pp. 421-430.
Fisher, Joseph A., "Very Long instruction Word Architectures and the ELI-312", 1983, ACM, International Symposium on Computer Architecture, pp. 140-150.
Gonzalez, R.C., Woods R.E., "Digital Image Processing", Addison-Wesley Publishing Company, Inc., pp. 458-462, 1992.
Gregory Ta Kovacs, Micromachined transducers sourcebook. 1998, Tom Casson, pp. 289-293.
Hayat et al., "A Fast Thinning Algorithom based on Image Compression", IEEE 1991, pp. 2661-2664.
Litwinowicz, "Processing Images and Video for an Impressionist Effect", SIGGRAPH Conference Proceedings, pp. 1-9.
Meade, Instruction Manual 1996, Meade Instruments Corporation, 1-16.
Ogniewicz, Skeleton-Space: A Multiscale Space Description Combining Region and Boundary Information, IEEE 1994, pp. 746-751.
Russ, John C., "The image processing handbook", 2nd Edition, CRC Press, pp. 355-361, 1994.
Sakamoto T., Makanishi C., Hase T, Software Pixel Interpolation for Digital Still Cameras Suitable for a 32-Bit MCU, IEEE Transactions on Consumer Electronics, vol. 44, No. 4, Nov. 1998.
Henrich D. Space-efficient Region Filling in Raster Graphics International Journal of Computer Graphics 1993 (Abstract).
Ohzu et al., Behind the Scenes of Virtual Reality: Vision and Motion Proceedings of the IEEEE, Invited Paper, vol. 84, Issue 5, May 1996. pp. 782-798.
Ong et al., "Image Analysis of Tissue Sections" Computers in Biology and Medicine, vol. 26, No. 3, May 1996. Elsevier Science Lt.
Salisbury et al., "Interactive Pen-and-Ink Illustration", SIGGRAPH Conference Proceedings, pp. 101-108.
Singh et al., "Object Skeletons from Sparse Shape in Industrial Image Settings", IEEE 1998, pp. 3388-3393.
Thorpe, Laurence J., and Takeuchi, A., "The All-Digital Camcorder—The Arrival of Electronic Cinematography", SMPTE Journal, Jan. 1996, p. 13-30.
Yarmish et al (Assembly Language Fundamentals: ISBN: 0-201-08798-7: pp. 13-16)—1979.
Laurent Petit and Jean-Didier Legat, "VLIW Processor Architecture Adapted to FPAs", May 1998, SPIE, vol. 3410, 99 128-132.
Booklet "First impressions: digital photography", IS&T 46th Annual Conference, cambridge, Massachusetts, May 11, 1993.
Chi et al., "Drawing and Animation Using Skeletal Strokes", Computer Graphics 1994, pp. 109-118.
Curtis et al., "Computer-Generated Watercolor", SIGGRAPH Conference Proceedings 1997, pp. 421-430.
Foley, "Computer Graphics: Principles and Practice", Second Edition, pp. 604-853, 1990.
Litwinowicz, "Processing Images and Video for an Impressionist Effect", SIGGRAPH 1997 Conference Proceedings, pp. 407-414.
Salisbury et al., "Interactive Pen-and-Ink Illustration", SIGGRAPH Conference Proceedings 1994, pp. 101-108.

\* cited by examiner

CAMERA SYSTEM FOR WITH VELOCITY SENSOR AND DE-BLURRING PROCESSOR

CROSS REFERENCES TO RELATED APPLICATIONS

The present application is a continuation of U.S. application Ser. No. 12/642,831, filed Dec. 20, 2009, now issued U.S. Pat No. 7,907,178, which is a continuation of U.S. application Ser. No. 11/499,806, filed Aug. 7, 2006, now issued U.S. Pat. No. 7,646,403, which is a continuation of U.S. application Ser. No. 09/113,090 filed on Jul. 10, 1998, now issued U.S. Pat. No. 7,110,024, the contents of all of which are herein incorporated by reference.

FIELD OF THE INVENTION

The present invention relates to digital image processing and in particular discloses A Camera System Having Motion Deblurring Means. Further the present invention relates to the field of digital image cameras and in particular discloses a camera system having motion blur compensating means.

BACKGROUND OF THE INVENTION

Motion blur in the taking of images is a common significant problem. The motion blur normally occurs as a result of movement of the camera while taking the picture or otherwise as a result of movement of objects within an image. As a result of motion blur, it is often the case that the image taken is non optimal.

SUMMARY OF THE INVENTION

According to an aspect of the present disclosure, a camera system for outputting deblurred still images comprises a portable handheld camera device comprising an image sensor for recording an image; a two-dimensional accelerometer for detecting an angular velocity of the camera system relative to an external environment and to produce an angular velocity output indicative thereof; a linear image sensor for sensing data provided on an encoded card inserted into the camera system, the encoded card containing instructions for the manipulation of the image; and a processor for receiving the image from the image sensor, receiving the angular velocity output from the two-dimensional accelerometer, and processing the image in accordance with the instructions sensed from the encoded to deblur any blurred pixels present in the image in consideration of the angular velocity output.

BRIEF DESCRIPTION OF THE DRAWINGS

Notwithstanding any other forms which may fall within the scope of the present invention, preferred forms of the invention will now be described, by way of example only, with reference to the accompanying drawing in which.

DETAILED DESCRIPTION

Figure 2:
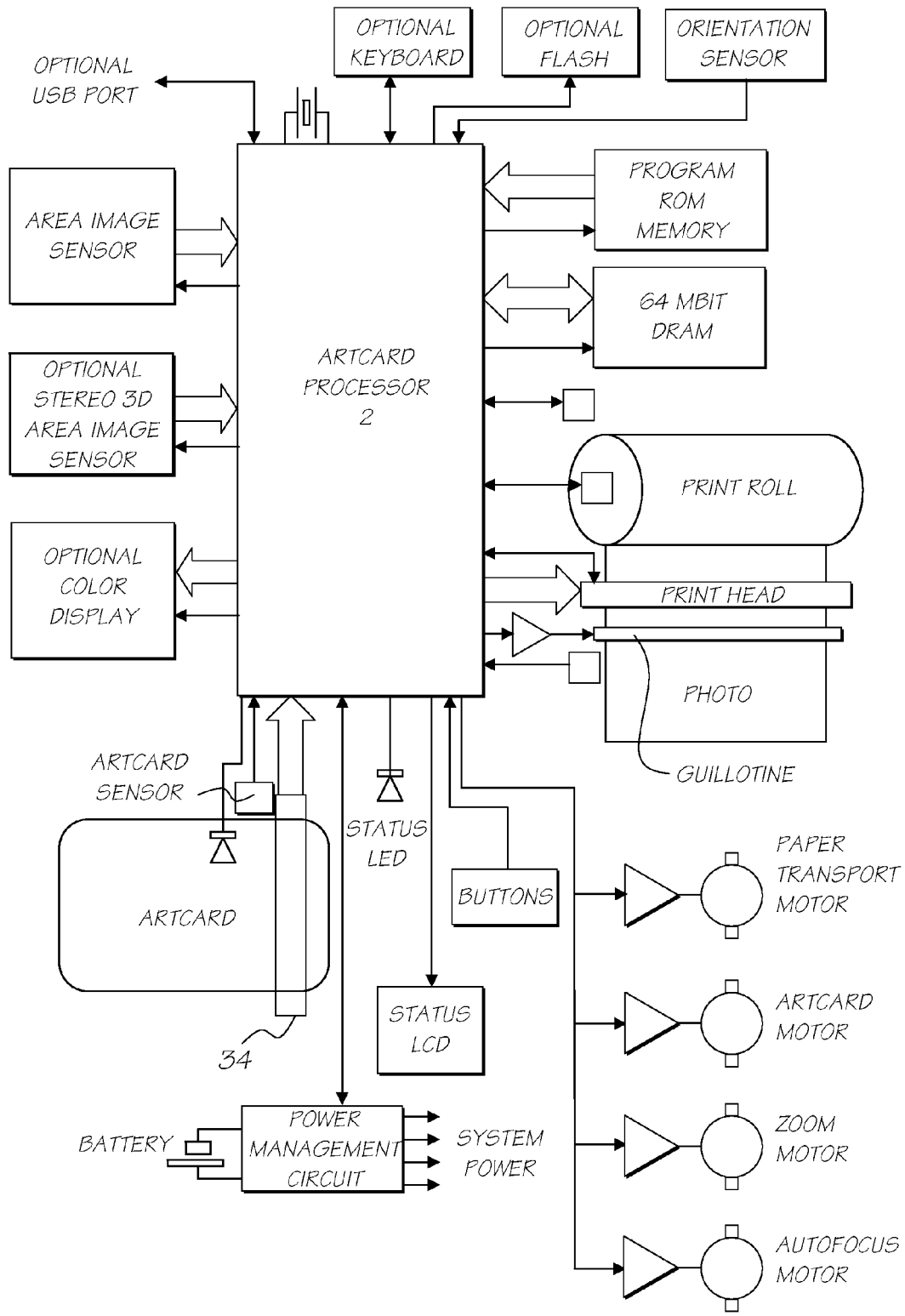
FIG. 2 is a schematic block diagram of the main Artcam electronic components.

FIG. 2 illustrates a linear image sensor 34 for incorporation in a camera system. The linear image sensor converts Artcard data images to electrical signals, which are communicated to the ACP. The linear image sensor 34 is fabricated using either CCD or APS CMOS technology. The active length of the linear image sensor is 50 mm, equal to the width of the data array on the Artcard.

To satisfy Nyquist's sampling theorem, the resolution of the linear image sensor is at least twice the highest spatial frequency of the Artcard optical image reaching the linear image sensor. In practice, data detection is easier if the linear image sensor resolution is substantially above this. A resolution of 4800 dpi (189 dpmm) is chosen, giving a total of 9,450 pixels. This resolution requires a pixel sensor pitch of 5.3 [mu]m. This can readily be achieved by using four staggered rows of 20 [mu]m pixel sensors.

The linear image sensor is mounted in a special package which includes an LED to illuminate the Artcard via a light-pipe.

The Artcard reader light-pipe can be a molded light-pipe which has several functions:

1. It diffuses the light from the LED over the width of the card using total internal reflection facets.
2. It focuses the light onto a 16 μm wide strip of the Artcard using an integrated cylindrical lens.
3. It focuses light reflected from the Artcard onto the linear image sensor pixels using a molded array of microlenses.

The preferred embodiment is preferably implemented through suitable programming of a hand held camera device such as that described in Australian Provisional Patent Application No. PO7991 filed 15 Jul. 1997 entitled "Image Processing Method and Apparatus (ART01)", in addition to Australian Provisional Patent Application entitled "Image Processing Method and Apparatus (ART01a)" filed concurrently herewith by the present applicant, the content of which is hereby specifically incorporated by cross reference.

The aforementioned patent specifications disclose a camera system, hereinafter known as an "Artcam" type camera, wherein sensed images can be directly printed out by an internal Artcam portable camera unit. Further, the aforementioned specification discloses means and methods for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards hereinafter being known as "Artcards". The Artcam further has significant onboard processing power by an Artcam Central Processor unit (ACP) which is interconnected to a memory device for the storage of important data and images.

In the preferred embodiment, the Artcam device includes a two dimensional motion sensor. The motion sensor comprises a small micro-electro mechanical system (MEMS) device or other suitable device able to detect motion in two axes. The motion sensor is preferably mounted on the camera device and its output monitored by the Artcam central processor device which is disclosed in the afore-mentioned patent specifications.

Figure 1:
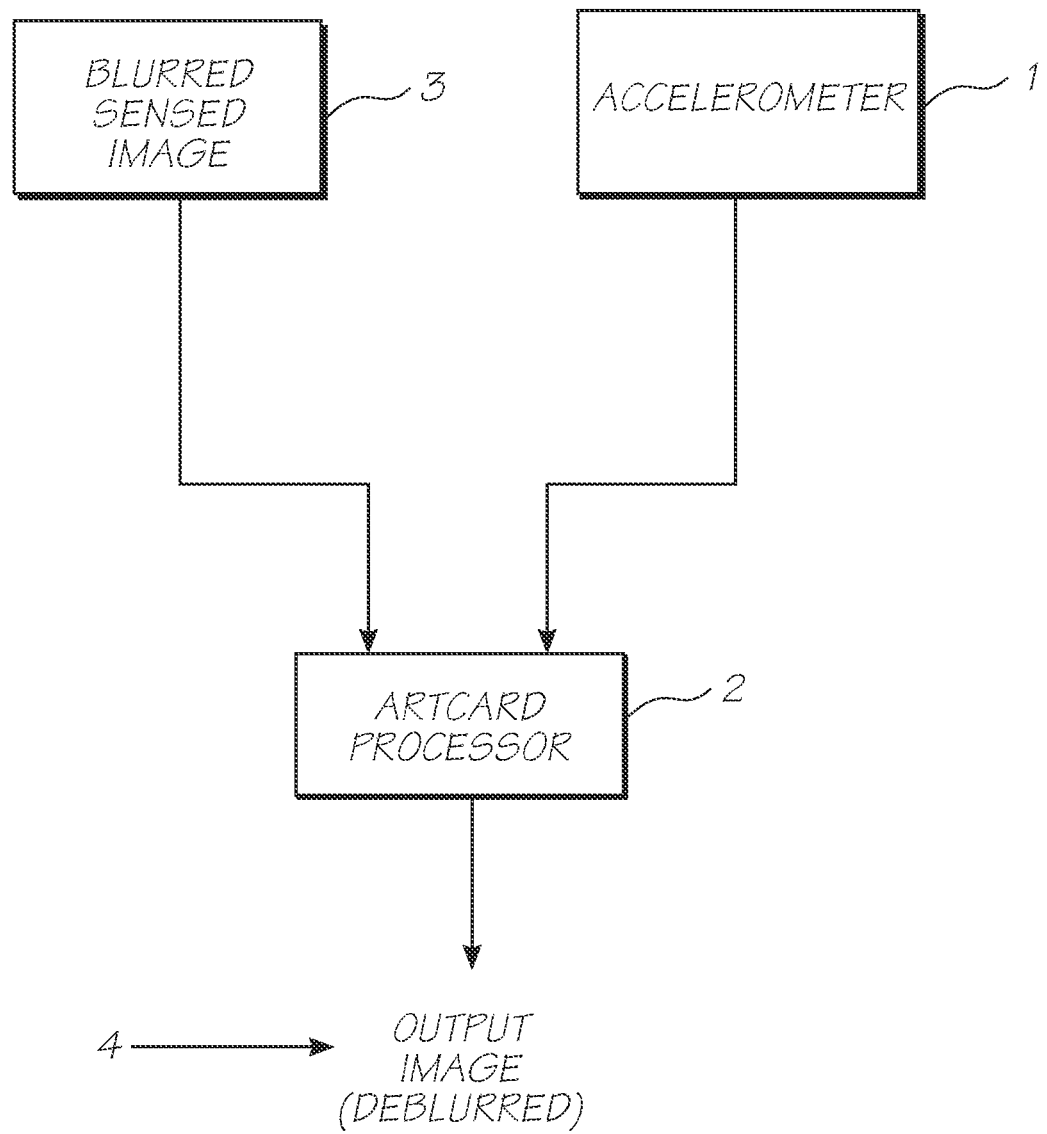
FIG. 1 illustrates a schematic implementation of the preferred embodiment.

Turning now to FIG. 1, there is illustrated a schematic of the preferred arrangement of the preferred embodiment. The accelerometer 1 outputs to the Artcard processor 2 which also receives the blurred sensed image from the CCD device. The Artcard processor 2 utilises the accelerometer readings so as to determine a likely angular velocity of the camera when the picture was taken. This velocity factor is then utilised by a suitably programmed Artcard processor 2 to apply a deblurring function to the blurred sensed image 3 thereby outputting a deblurred output image 4. The programming of the Artcard processor 2 so as to perform the deblurring can utilise standard algorithms known to those skilled in the art of computer programming and digital image restoration. For example, reference is made to the "Selected Papers on Digital Image Restoration", M. Ibrahim Sezan, Editor, SPIE Milestone series, volume 74, and in particular the reprinted paper at pages 167-175 thereof. Further, simplified techniques are shown in the "Image Processing Handbook", second edition, by John C. Russ, published by CRC Press at pages 336-341 thereof.

It would be therefore obvious to the person skilled in the art that many different techniques for motion blur removal can be utilised in the preferred embodiment. Additionally, other forms of motion sensors may be provided. Once the input image has been deblurred, the image is then able to be printed out by the Artcam device in accordance with the techniques as discussed in the afore-mentioned patent specification.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

We claim:

1. A camera system for outputting deblurred still images, said camera system comprising:
   a portable handheld camera device comprising an image sensor for recording an image;
   a two-dimensional accelerometer for detecting an angular velocity of the camera system relative to an external environment and to produce an angular velocity output indicative thereof;
   a linear image sensor for sensing data provided on an encoded card inserted into the camera system, the encoded card containing instructions for the manipulation of the image;
   and
   a processor for receiving the image from the image sensor, receiving the angular velocity output from the two-dimensional accelerometer, and processing the image in accordance with the instructions sensed from the encoded card to deblur any blurred pixels present in the image in consideration of the angular velocity output.

2. A camera system according to claim 1, wherein the linear image sensor includes an LED for illuminating the encoded card via a light-pipe, and a molded array of microlenses for focusing light reflected from the encoded card.

\* \* \* \* \*